United States Patent [19]
Amatucci et al.

[11] Patent Number: 5,693,435
[45] Date of Patent: Dec. 2, 1997

[54] $Li_xCoO_2$ ELECTRODE FOR HIGH-CAPACITY CYCLE-STABLE SECONDARY LITHIUM BATTERY

[75] Inventors: Glenn G. Amatucci, Raritan; Jean-Marie Tarascon, Martinsville, both of N.J.

[73] Assignee: Bell Communications Research, Inc., Morristown, N.J.

[21] Appl. No.: 515,777

[22] Filed: Aug. 16, 1995

[51] Int. Cl.[6] .............................. H01M 4/58; H01M 6/00; C01G 49/00
[52] U.S. Cl. .......................... 429/218; 29/623.1; 423/594
[58] Field of Search .......................... 429/218; 29/623.1; 423/594

[56] References Cited

U.S. PATENT DOCUMENTS

| | | | |
|---|---|---|---|
| 4,567,031 | 1/1986 | Riley | 423/593 |
| 5,196,279 | 3/1993 | Tarascon | 429/194 |
| 5,211,933 | 5/1993 | Barboux et al. | 423/596 |
| 5,296,318 | 3/1994 | Gozdz et al. | 429/192 |
| 5,422,203 | 6/1995 | Guyomard et al. | 429/194 |
| 5,425,932 | 6/1995 | Tarascon | 423/599 |

FOREIGN PATENT DOCUMENTS 6-64928  3/1994  Japan.

OTHER PUBLICATIONS

"$Li_xCoO_2$ (0<x<1) A New Cathode Material For Batteries Of High Energy Density", K. Mizushima et al., *Mat. Res. Bull.*, 15, 1980, 783–789.

Mizushima et al., "LiXCoO2 (0<x<1): A New Cathode Material For Batteries of High Density", Mat. Res. Bull., vol. 15, pp. 783–789 1980.

*Primary Examiner*—Kathryn L. Gorgos
*Assistant Examiner*—Edna Wong
*Attorney, Agent, or Firm*—Lionel N. White; Joseph Giordano

[57] ABSTRACT

$Li_xCoO_2$ wherein x is about 1.00 to 1.15 is annealed at about 950° C. to 1000° C. for about 0.25 to 10 hours to yield a lithium intercalation material which is used in an electrode to provide a rechargeable battery having high specific capacity and the capability of maintaining such capacity over numerous operating charge/discharge cycles.

5 Claims, 9 Drawing Sheets

$Li_xCoO_2$ ELECTRODE FOR HIGH-CAPACITY CYCLE-STABLE SECONDARY LITHIUM BATTERY

BACKGROUND OF THE INVENTION

The present invention relates to secondary, rechargeable lithium batteries, particularly such batteries which include electrodes comprising a lithium intercalation compound. More particularly, the invention relates to a method of processing a $Li_xCoO_2$ intercalation compound to obtain an electrode material which yields a battery of high specific capacity, i.e., the capability of retaining a substantial electrical charge and providing a high ratio of electrical output to battery weight, and which is capable of maintaining such capacity over a prolonged operating period of numerous charge/discharge cycles.

Rechargeable lithium batteries are gaining commercial importance with the advent of electrode materials which are better able to intercalate and deintercalate lithium ions in a consistent manner and at higher voltages. Prominent among such compounds are $LiCoO_2$, $LiNiO_2$, and $LiMn_2O_4$, of which $LiCoO_2$, for example, is capable of reversibly intercalating lithium ions at voltages of about 4.2 V, thereby enabling the fabrication of rechargeable batteries having an output voltage and energy density three times greater than the widely-used Ni—Cd battery. Further improvement and acceptance of secondary lithium batteries have also been promoted by developments in lithium-ion cell technology and compositions, such as described in U.S. Pat. Nos. 5,196,279 to Tarascon, 5,296,318 to Gozdz et al., and 5,422,203 to Guyomard et al.

The synthesis of $LiCoO_2$ electrode materials has typically entailed the high-temperature reaction of lithium and cobalt precursor compounds as described, for example, by Mizushima et al., "$Li_xCoO_2$ ($0 \leq x \leq 1$): A New Cathode Material For Batteries Of High Energy Density", *Mat. Res. Bull.*, 15, 1980, 783–789. Similar procedures have been employed in the preparation of $LiMn_2O_4$ electrode materials, with further development of increased specific capacity in these compounds by precise temperature controls as disclosed in U.S. Pat. No. 5,425,932 to Tarascon. Other researchers have investigated synthesis and treatment processes in an attempt to similarly improve the electrochemical properties of $LiCoO_2$ intended for use in lithium battery electrodes. Such work relating to lower temperature syntheses has been described, for example, in U.S. Pat. Nos. 4,567,031 to Riley and 5,211,933 to Barboux et al. While some successes were realized, there was no entirely satisfactory process achieved for preparing high capacity, or high energy density, $LiCoO_2$ intercalation materials which would retain such capacity throughout repeated cycling to useful voltages in the range above about 4.2 V. The present invention provides a unique process for obtaining such desirable electrode materials.

SUMMARY OF THE INVENTION

Current $LiCoO_2$ compounds, of which a number are commercially-available, provide a measure of success in rechargeable batteries which are cycled up to about 4.2 V, but the recycling life of such batteries, as exhibited in energy density, or specific capacity, is substantially limited. Cycling in lower voltage ranges can prolong the capacity and life of these batteries, but the useful power output sought in many commercial implementations is severely diminished as a result. By means of the present invention, however, these earlier compounds may be improved in electrochemical properties to yield high-capacity cycle-stable lithium battery electrode intercalation materials which function favorably into an upper cycling range of about 4.3 V to 4.4 V over numerous charging cycles without significant loss of capacity.

The process of the invention essentially comprises a high-temperature annealing operation in which the $LiCoO_2$ compound is heated to a range in excess of about 950° C. for a period of 0.25 hr or more before being cooled to ambient temperature for use as an intercalation electrode. Whereas previous $LiCoO_2$ syntheses or processing operations generally avoided temperatures above about 900° C. in order to minimize the deleterious effects anticipated, for example by Riley, above-noted, it has now been discovered that annealing these intercalation compounds at such elevated temperatures is beneficial in maximizing both the level and stability of battery capacity.

The improvements realized in the invention are notable with $Li_xCoO_2$ compounds wherein x is in the range of about 0.975 to 1.15, preferably between about 1.0 and 1.1. The annealing temperature utilized with these compounds may range from about 950° C. to 1100° C. at which the materials are held for periods of about 0.25 to 10 hr. An economical balance of time and temperature is about 1000° C. for a period of 1 to 3 hours. A successful annealing cycle may be estimated with relative ease, i.e., without the necessity of fabricating and cycling test cells, by means of a simple thermogravimetric analysis of annealed material, as noted in greater detail below.

BRIEF DESCRIPTION OF THE DRAWING

The present invention will be described with reference to the accompanying drawing of which.

DESCRIPTION OF THE INVENTION

In order to simplify the testing reported in the following exemplary descriptions of the present invention, electrolytic cells were of a standard Swagelok configuration in which an electrolyte-saturated glass paper separator was interposed between a lithium foil negative electrode and a positive electrode comprising about 5% each of conductive carbon black and a polyvinylidene fluoride binder with the Li$_x$CoO$_2$ sample under test. In order to provide high cell efficiency and to avoid decomposition at the upper end of the charging cycle, an electrolyte composition of 1M LiPF$_6$ in a 67:33 mixture of ethylene carbonate dimethylcarbonate was used. Subsequent long-term testing of sample materials in ultimately preferred Li-ion battery cells confirmed the veracity of these exemplary tests.

Charge/discharge cycling of the test cells at a C/10 rate (one cycle/10 hours) was automatically controlled and recorded over the predetermined operating ranges (3–4.3 V or 3–4.4 V, as noted below in each instance) using a potentiostatic mode coulometer (CNRS, Grenoble, France, Model "Mac-Pile", version A-3.01e/881) to obtain the cyclovoltammetry analyses shown in the plots as specific cell capacity normalized to milliamp hours per gram (mAh/g) of Li$_x$CoO$_2$ test sample. Thermogravimetric analyses were conducted in the standard manner with a commercially-available instrument (Perkin-Elmer High Temperature Model TG).

Sample Li$_x$CoO$_2$ materials of varying lithium content were prepared at the outset in a normal manner by mixing Li$_2$CO$_3$ and CO$_3$O$_4$ to obtain the desired stoichiometric Li:Co ratios and calcining the mixtures in repeated heating operations to obtain stable compounds which exhibited commonly recognized properties, e.g., X-ray diffraction patterns and lattice parameters in the range of a=0.28170(2) and c=1.4061(8) nm. To this end, the mixtures were typically oven-heated to about 850° C. over a period of about 12 hours and held at that temperature for about 20 hours before being cooled to working ambient over about 24 hours. The samples were then milled and the powders reheated to about 850° C. over a period of about 5 hours and held at that temperature for about 12 hours before being cooled to working ambient over about 24 hours and milled to final powder consistency. After initial tests were conducted with these materials, commercial single phase, high Bragg ratio Li$_x$CoO$_2$ compounds with matching characteristics were acquired for use in the following examples.

EXAMPLE 1

Figure 1:
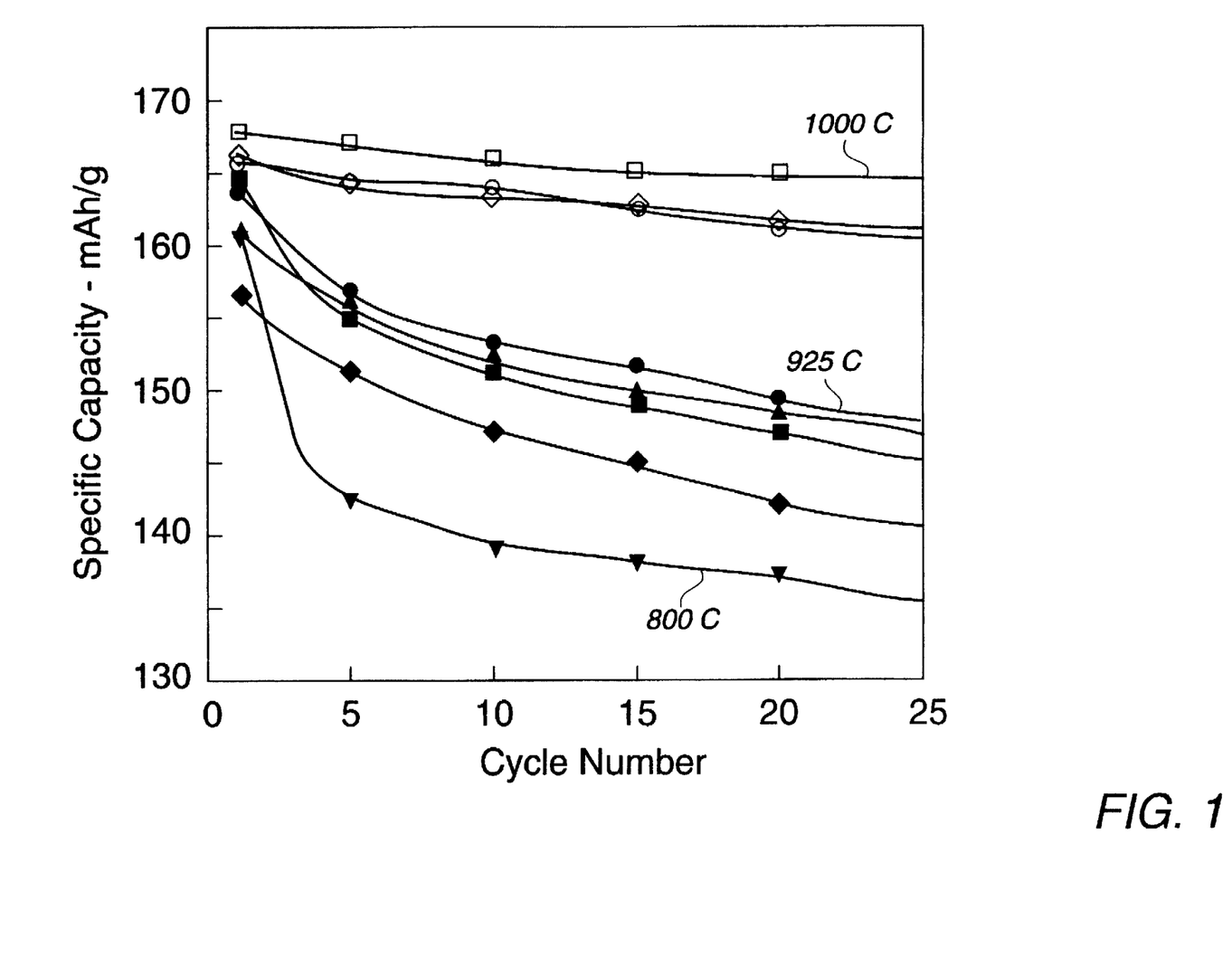
FIG. 1 presents a series of plots of electrochemical cell capacity v. operating cycles for $Li/LiCoO_2$ cells having electrodes comprising $LiCoO_2$ annealed at temperatures varying from 800° C. to 1000° C.
Figure 2:
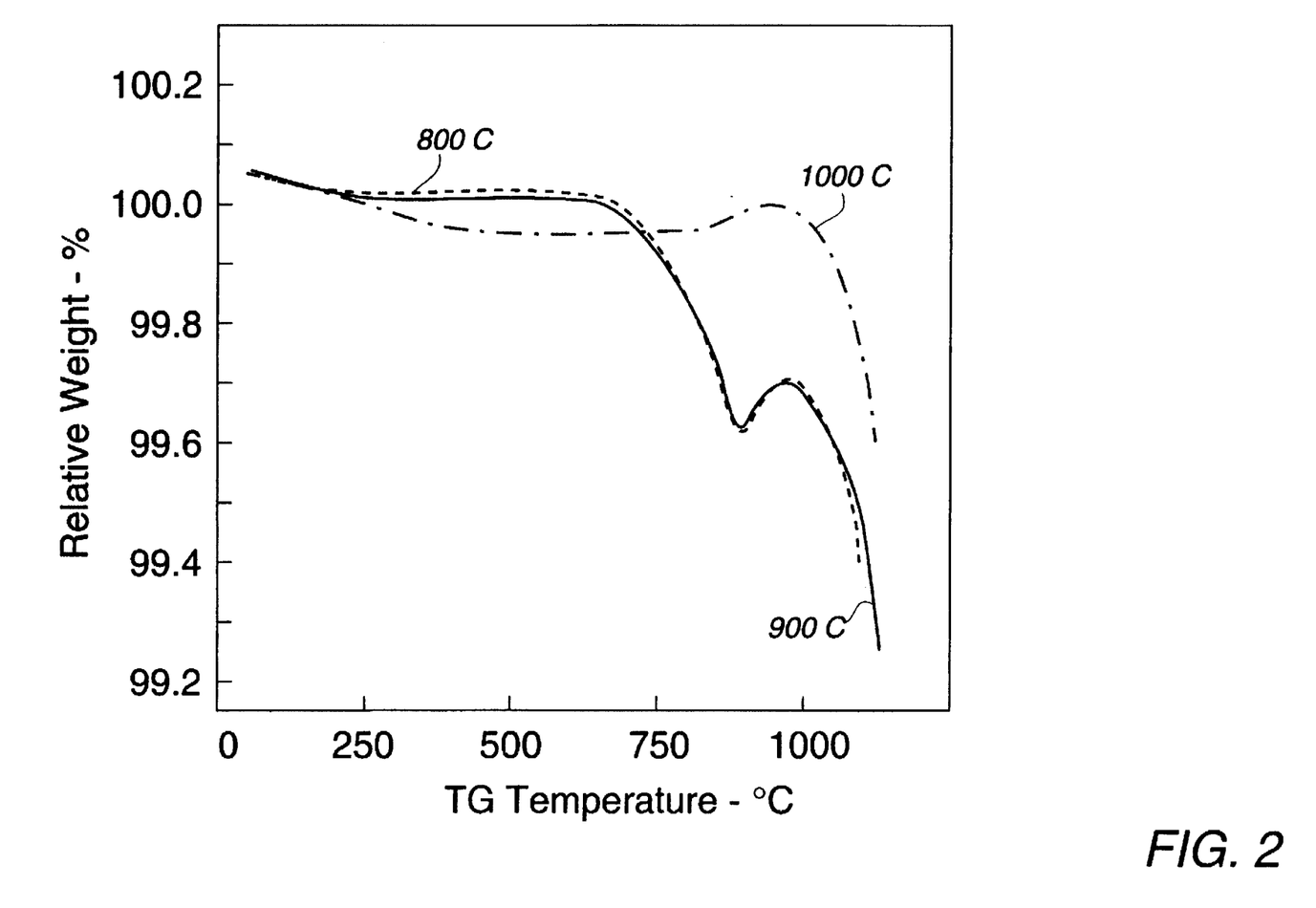
FIG. 2 presents a series of thermogravimetric analysis plots of $LiCoO_2$ compounds annealed at temperatures varying from 800° C. to 1000° C.

Eight samples of commercial Li$_{1.0}$CoO$_2$ were heated at a rate of about 200° C./h to respective annealing temperatures varying by increments of about 25° C. over the range of 800° C. to 1000° C. and were held at those temperatures for about 3 h. After this annealing period, the samples were cooled to normal ambient (room) temperature over a period of about 24 h. Each of the samples was then incorporated into a standard test cell and cycled in a 3 V to 4.3 V range. The specific capacities of the respective cells during the period of about 25 cycles were calculated and appear in FIG. 1 as the plots of capacity increasing with annealing temperature. As may be seen, distinct improvement in the level of specific capacity in the resulting cells were obtained as annealing temperatures increased, with acceptable levels of both degree and stability of capacity being achieved in the range of about 950° C. to 1000° C. Thermogravimetric analyses of the annealed LiCoO$_2$ samples showed a correlation between weight loss during analysis temperature scaling and improvement obtained in the annealing operation. As depicted in FIG. 2, a distinct weight loss in the analysis range of about 650° C. to 900° C. was seen in low-stability samples annealed below about 950° C., while desirable, high-stability materials resulting from annealing above that temperature showed no such weight loss. This correlation provides an effective means of readily estimating the success of an annealing operation.

EXAMPLE 2

Figure 3:
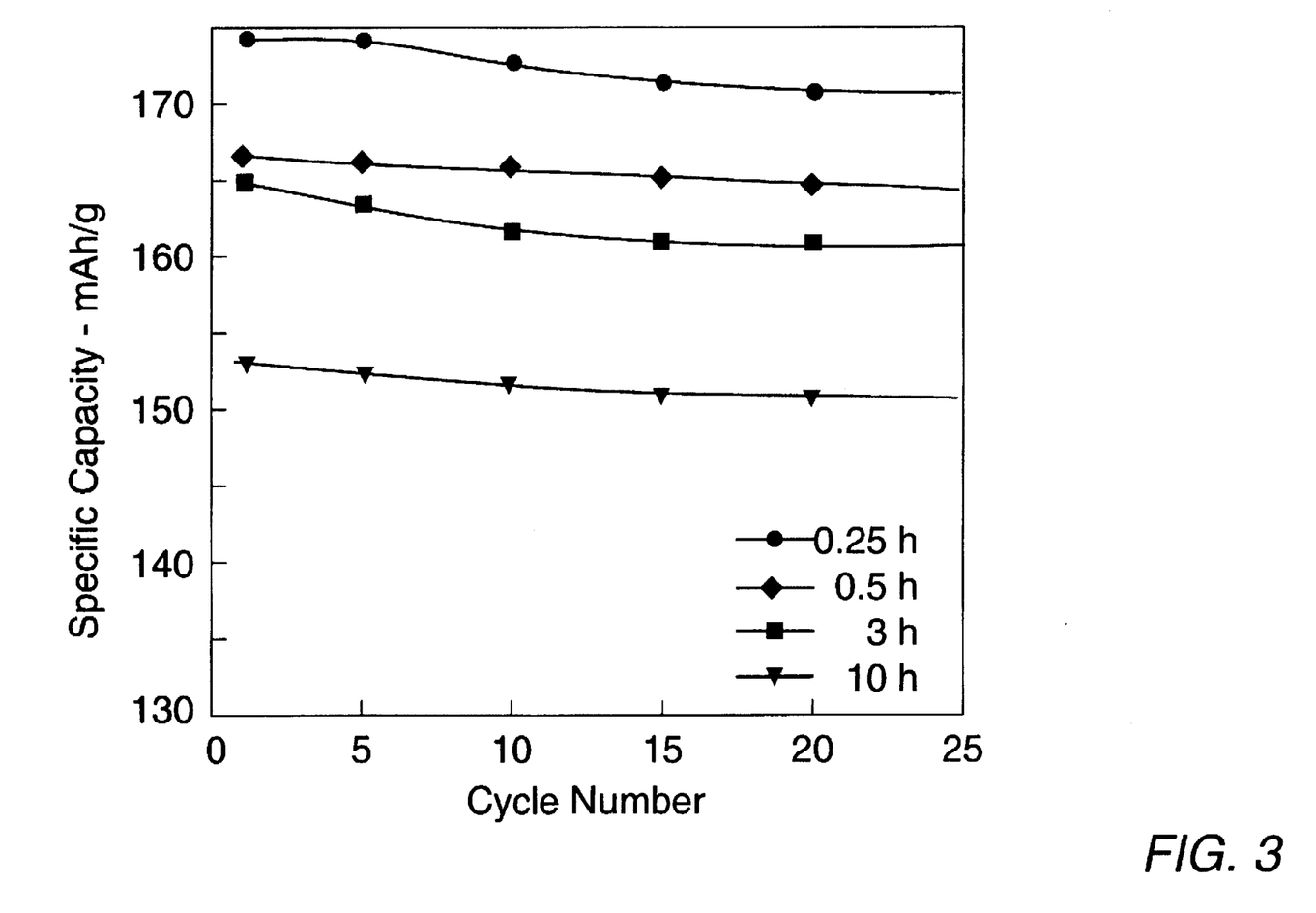
FIG. 3 presents a series of plots of electrochemical cell capacity v. operating cycles for $Li/LiCoO_2$ cells having electrodes comprising $LiCoO_2$ annealed at about 1000° C. for periods of time varying 0.25 to 10 hours.

In order to determine an optimum range of annealing time in the effective temperature range, samples of the Li$_{1.0}$CoO$_2$ test compound of Ex. 1 were annealed in the same manner at about 1000° C. over staged time periods of 0.25, 0.5, 3, and 10 h. The resulting materials were incorporated into standard test cells and exhibited cycling properties as shown in the plots of FIG. 3. While the desirable stability of cell capacity may be seen to be a function of annealing temperature, the level of such capacity decreases with extended annealing time, resulting in a preferred annealing period of about 0.25 to 3 h.

EXAMPLE 3

Figure 4:
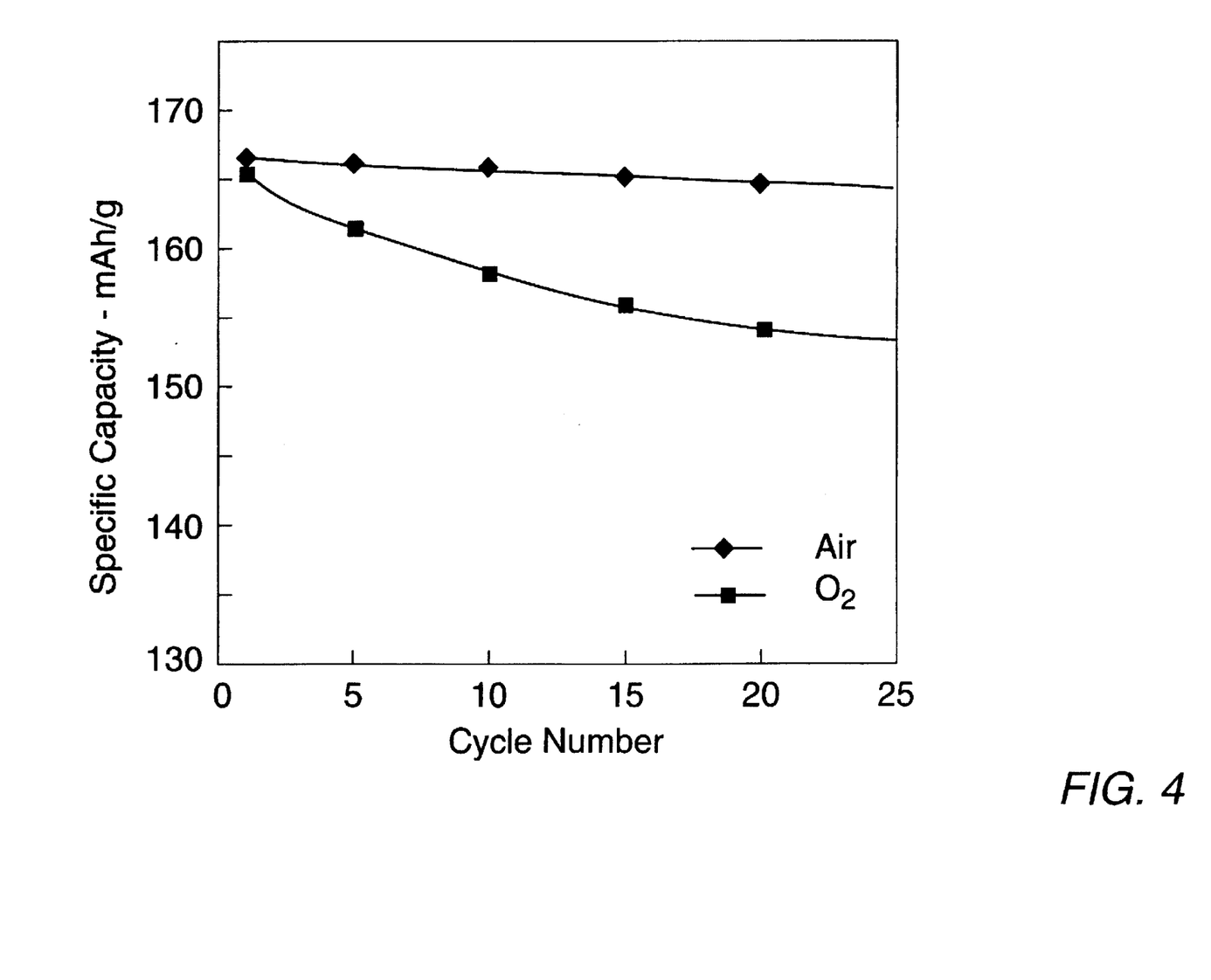
FIG. 4 presents comparative plots of electrochemical cell capacity v. operating cycles for $Li/LiCoO_2$ cells having electrodes comprising $LiCoO_2$ annealed at about 1000° C. in respective atmospheres of air and oxygen.

Annealing respective samples of the Ex. 1 test compound through a 1000° C./0.5 h cycle in ambient (air) and oxygen atmospheres indicated that, unlike the favorable effect of oxygenation in the heat-treatment of LiMn$_2$O$_4$ as suggested by Tarascon in U.S. Pat. No. 5,425,932 earlier noted, the present processing of LiCoO$_2$ is preferably accomplished under ambient conditions where some reductive decomposition of the compound contributes to improved capacity stability. As may be seen in FIG. 4, annealing in a higher oxygen ambient is a significant detriment to obtaining acceptable stability.

EXAMPLE 4

Figure 5:
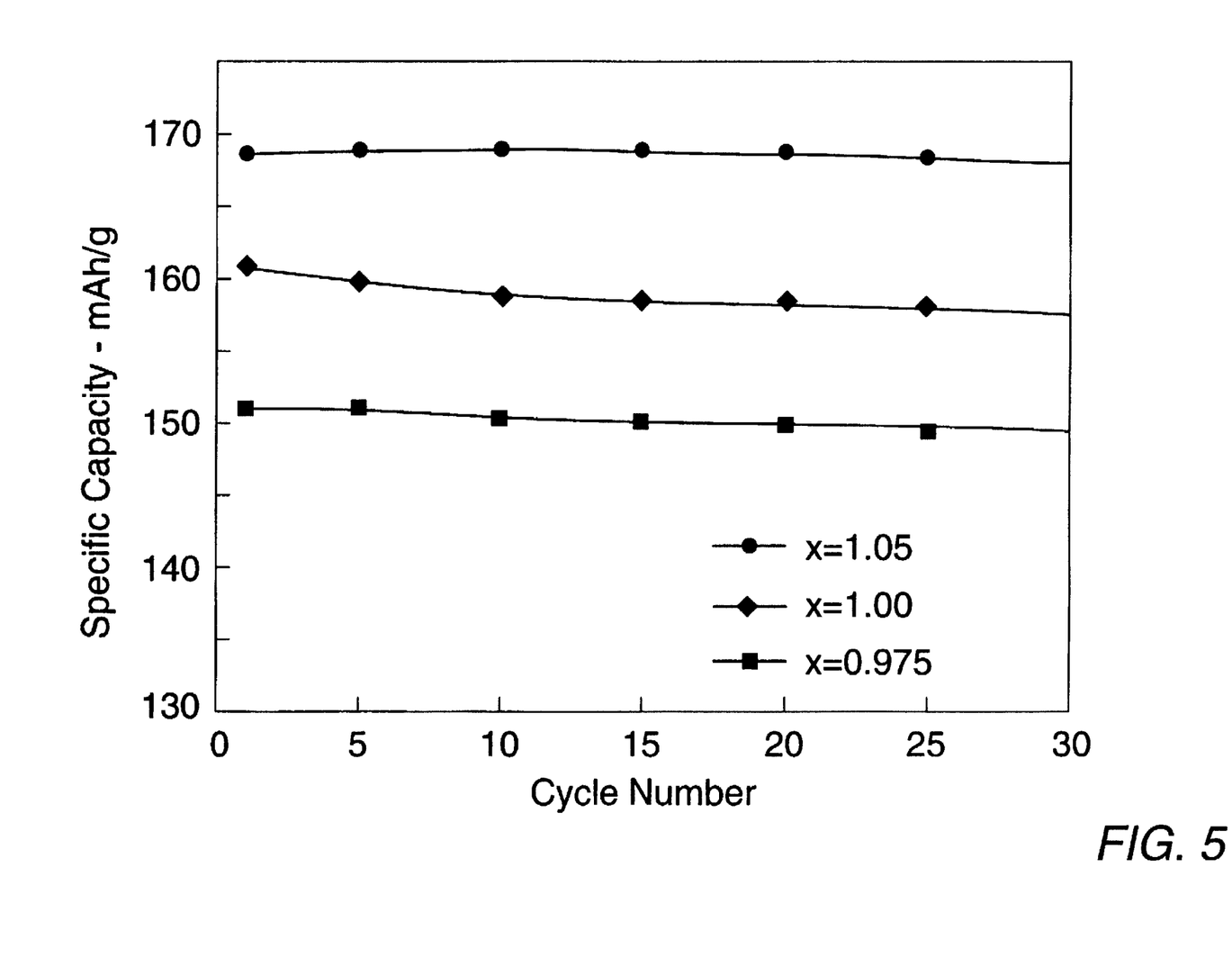
FIG. 5 presents a series of plots of electrochemical cell capacity v. 3 V to 4.3 V operating cycles for $Li/LiCoO_2$ cells having electrodes comprising $Li_xCoO_2$ of varying Li content annealed at about 1000° C. according to the present invention.

In order to determine the efficacy of the present process over a range of Li$_x$CoO$_2$ of varying lithium content, samples of compounds with x=0.975, 1.00, and 1.05 were annealed through a 1000° C./3 h cycle in air and the resulting electrode materials were incorporated into standard test cells. Electrolytic cycling of the cells over the 3 V to 4.3 V range showed, as depicted in FIG. 5, that while the level of specific capacity varied as the lithium content of the original compound, the stability of the respective capacity was admirable.

EXAMPLE 5

Figure 6:
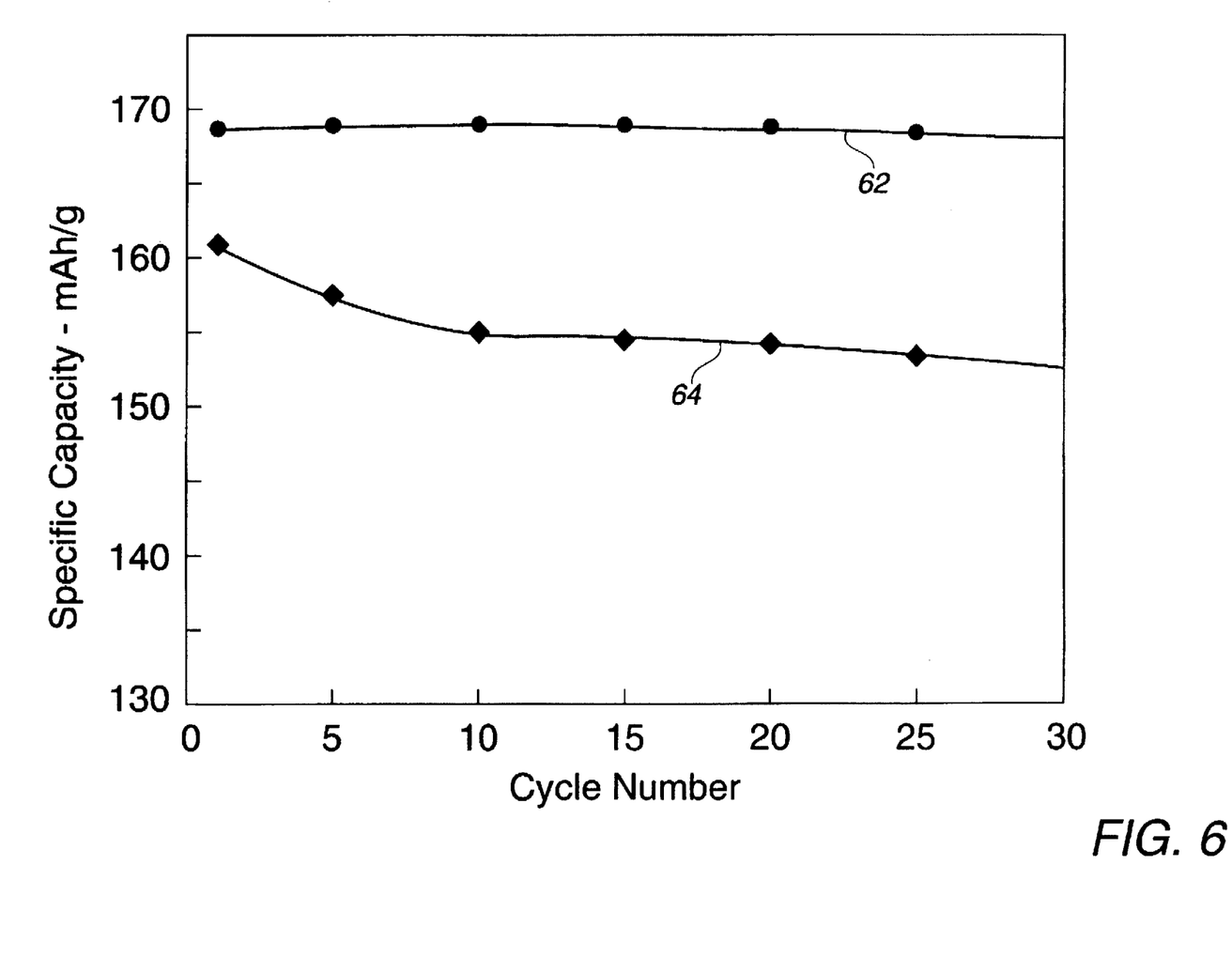
FIG. 6 presents comparative plots of electrochemical cell capacity v. operating cycles for $Li/LiCoO_2$ cells having electrodes comprising $Li_{1.05}CoO_2$ with and without annealing at about 1000° C. according to the present invention.
Figure 7:
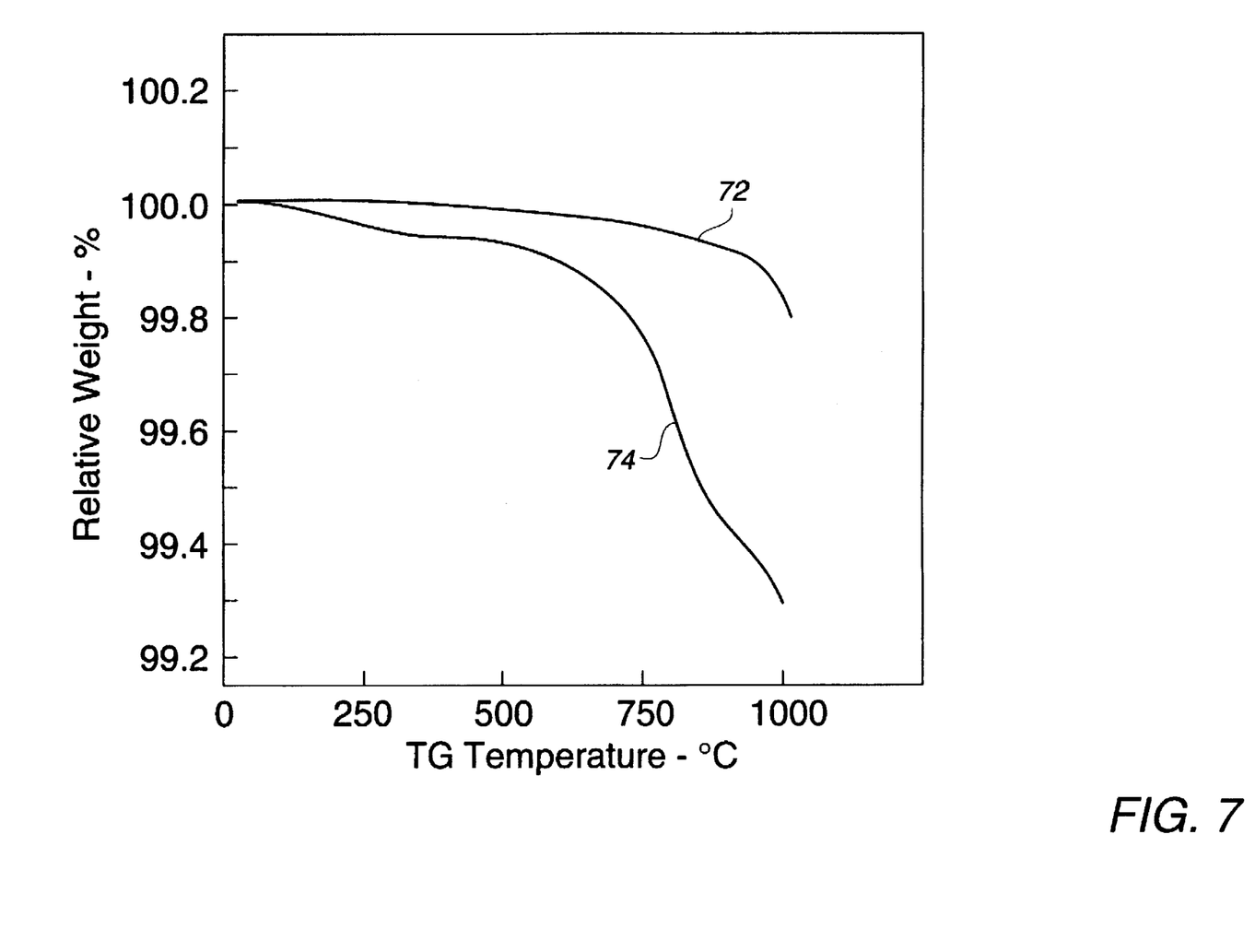
FIG. 7 presents comparative thermogravimetric analysis plots of the $Li_{1.05}CoO_2$ electrode materials of FIG. 6.

The effect of the process of Ex. 4 was confirmed in the similar annealing of only one of duplicate samples of Li$_{1.05}$CoO$_2$ which had been previously heat-cycled through 850° C. FIG. 6 shows the electrolytic cycling stability of the respective annealed and non-annealed samples in traces 62, 64. Thermogravimetric analysis of the samples confirmed also the correlation of weight stability with effective annealing as shown in the respective traces of the annealed and non-annealed samples at 72, 74.

EXAMPLE 6

Figure 8:
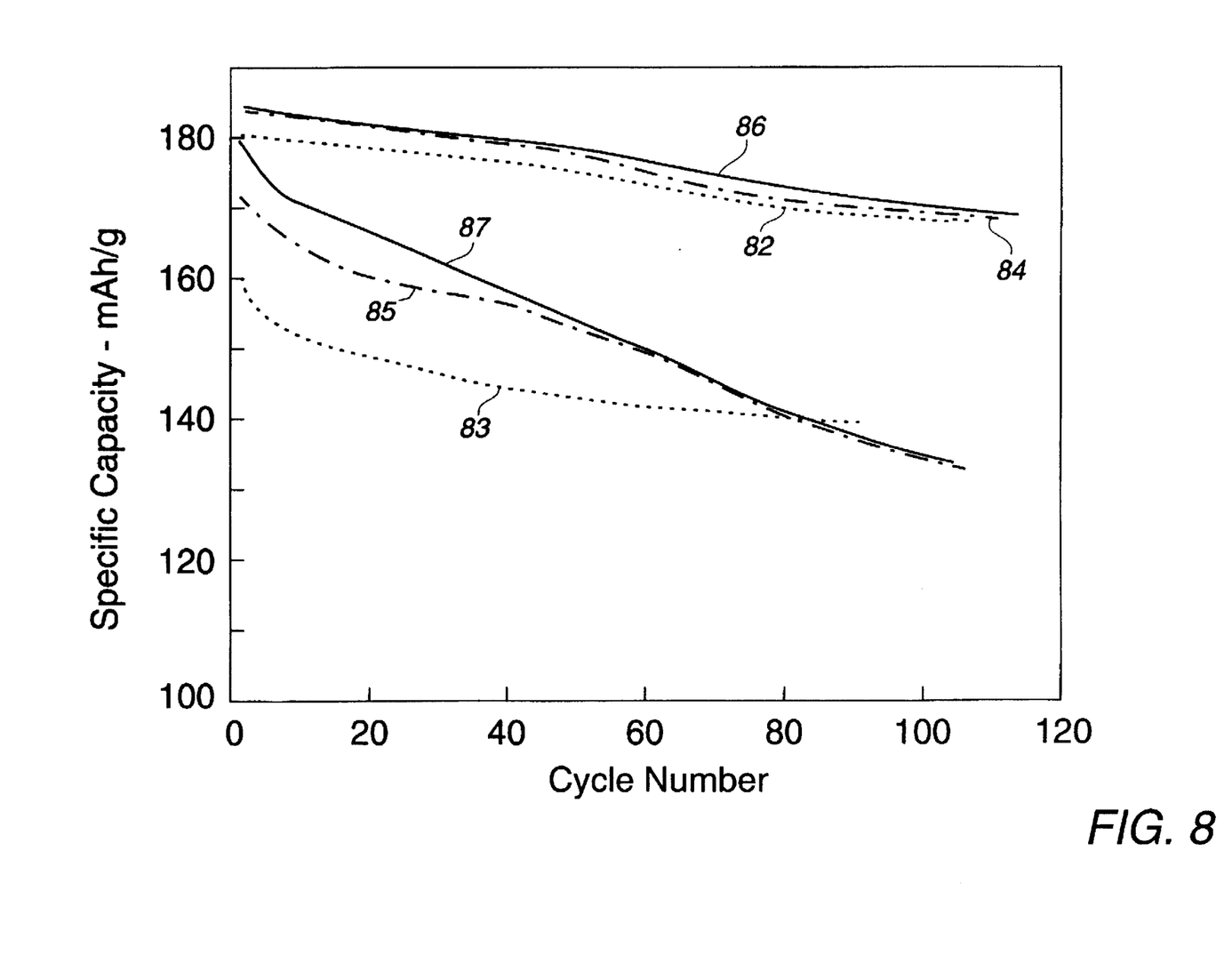
FIG. 8 presents a series of comparative plots of electrochemical cell capacity v. 3 V to 4.4 V operating cycles for $Li/LiCoO_2$ cells having electrodes comprising $Li_xCoO_2$ of varying Li content before and after annealing at about 1000° C. according to the present invention.

Efficacy of the annealing process of the present invention in improving both capacity and capacity stability for the 3 V to 4.4 V cycling range over extended test periods may be seen in the plots of FIG. 8 tracing the results from cells incorporating $Li_xCoO_2$ compounds having a range of lithium content. The improvement in cells with materials from compounds of x=1.00, 1.05, and 1.10 which were annealed through the 1000° C./3 h cycle may be seen in respective traces 82, 84, 86, when compared with the results from non-annealed counterparts at 83, 85, 87.

EXAMPLE 7

Figure 9:
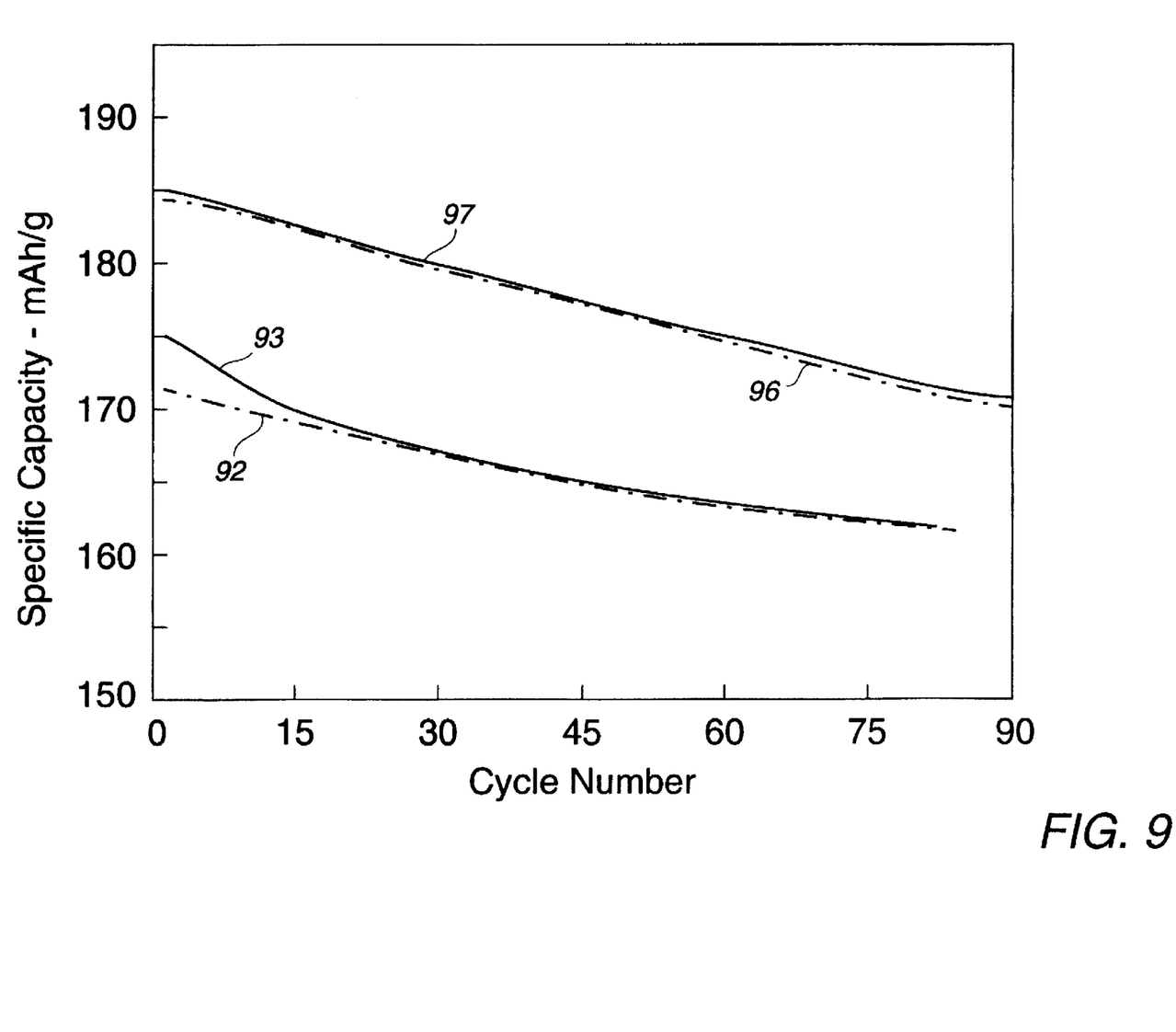
FIG. 9 presents a series of comparative plots of electrochemical cell capacity v. operating cycles of 3 V to 4.3 V and 3 V to 4.4 V for Li/LiCoO$_2$ cells having electrodes comprising Li$_x$CoO$_2$ of varying Li content annealed at about 1000° C. according to the present invention.

The results of similar extended electrolytic cycling tests are depicted in FIG. 9. Cells respectively incorporating annealed $Li_{1.05}CoO_2$ and $Li_{1.10}CoO_2$ electrode materials were tested over the ranges of both 3 V to 4.3 V (traces 92, 93) and 3 V to 4.4 V (traces 96, 97). The outstanding capacity levels and stabilities seen in these results attest to the improvements in rechargeable lithium battery technology achieved in the annealing process of the present invention.

This invention has been described in the foregoing specification and examples with reference to representative preferred embodiments and testing ranges and results. It will be apparent to the skilled artisan that reasonable variations in the recited parameters may be implemented with comparable success without exceeding the scope of the invention which is set forth in the appended claims.

What is claimed is:

1. A method of making a high-capacity cycle-stable secondary lithium battery having an electrode composition comprising $Li_xCoO_2$ characterized in that
   a) said $Li_xCoO_2$ is a compound wherein x is in the range of about 1.00 to 1.15;
   b) said $Li_xCoO_2$ compound is heated to a temperature in the range of about 950° C. to 1100° C.; and
   c) said heated compound is maintained in said temperature range for a period of about 0.25 to 10 hours before being incorporated into said electrode composition at a lower ambient temperature.

2. A method of preparing a $Li_xCoO_2$ compound useful in an electrode composition for a high-capacity cycle-stable secondary lithium battery characterized in that
   a) said $Li_xCoO_2$ is a compound wherein x is in the range of about 1.00 to 1.15;
   b) said $Li_xCoO_2$ compound is heated to an annealing temperature in the range of about 950° C. to 1100° C.; and
   c) said heated compound is maintained in said annealing temperature range for a period of about 0.25 to 10 hours before being allowed to cool to a lower ambient temperature.

3. A method according to claim 2 characterized in that
   a) said $Li_xCoO_2$ compound initially exhibits a distinct weight loss under thermogravimetric analysis in the range of about 650° C. to 900° C.; and
   b) said heated $Li_xCoO_2$ compound is maintained in said annealing temperature range for a period of time such that after cooling to ambient temperature the annealed compound exhibits no significant weight loss under said thermogravimetric analysis.

4. A $Li_xCoO_2$ compound prepared according to the method of claim 2.

5. A high-capacity cycle-stable secondary lithium battery having an electrode composition comprising a $Li_xCoO_2$ compound according to claim 4.

* * * * *